United States Patent
Tsao et al.

(10) Patent No.: US 8,000,716 B2
(45) Date of Patent: Aug. 16, 2011

(54) LOAD BALANCING APPARATUS AND METHOD IN WIRELESS NETWORK HOTSPOTS

(75) Inventors: Shiao-Li Tsao, Taipei (TW); Chih-Chien Hsu, TaiChung Hsien (TW); Tai-Xing Yu, TaiNan (TW)

(73) Assignees: Industrial Technology Research Institute, Hsinchu (TW); National Chiao Tung University, Hsinchu (TW)

( * ) Notice: Subject to any disclaimer, the term of this patent is extended or adjusted under 35 U.S.C. 154(b) by 1066 days.

(21) Appl. No.: 11/613,202

(22) Filed: Dec. 20, 2006

(65) Prior Publication Data

US 2008/0085723 A1 Apr. 10, 2008

(30) Foreign Application Priority Data

Oct. 5, 2006 (TW) .............................. 95137201 A

(51) Int. Cl.
*H04W 72/00* (2009.01)

(52) U.S. Cl. ............. 455/453; 455/452.1; 455/445; 455/438; 455/439; 370/335; 370/311; 370/328; 370/252; 370/468; 370/237; 370/238; 370/230; 718/105; 709/235; 709/239; 709/240; 709/243; 709/244

(58) Field of Classification Search .......... 455/453, 455/452.1, 452.2, 445, 438, 439; 370/338, 370/311, 328, 252, 468, 237, 238, 230; 718/105; 709/235, 239, 240, 243, 244
See application file for complete search history.

(56) References Cited

U.S. PATENT DOCUMENTS

| | | | | |
|---|---|---|---|---|
| 6,069,871 | A | 5/2000 | Sharma et al. | 370/209 |
| 6,236,656 | B1 | 5/2001 | Westerberg et al. | 370/395 |
| 6,574,474 | B1 | 6/2003 | Nielsen | 455/436 |
| 6,574,477 | B1 | 6/2003 | Rathunde | 455/453 |
| 7,027,415 | B1 | 4/2006 | Dahlby et al. | 370/322 |
| 7,031,738 | B2 * | 4/2006 | Struhsaker | 455/521 |
| 7,162,250 | B2 * | 1/2007 | Misra | 455/453 |
| 2004/0001467 | A1 * | 1/2004 | Cromer et al. | 370/338 |
| 2004/0260760 | A1 * | 12/2004 | Curnyn | 709/201 |
| 2005/0169294 | A1 * | 8/2005 | Tseng et al. | 370/437 |
| 2005/0198286 | A1 * | 9/2005 | Xu et al. | 709/225 |
| 2006/0120411 | A1 * | 6/2006 | Basu et al. | 370/539 |
| 2008/0085723 | A1 * | 4/2008 | Tsao et al. | 455/452.2 |

FOREIGN PATENT DOCUMENTS

| | | |
|---|---|---|
| EP | 1156623 | 11/2001 |
| WO | WO2004/004226 | 1/2004 |
| WO | WO2004/004227 | 8/2004 |
| WO | WO2005018164 | 2/2005 |
| WO | WO2005060177 | 6/2005 |
| WO | WO2006005224 | 1/2006 |

OTHER PUBLICATIONS

I. Papanikos and M. Logothetis, "A Study on Dynamic Load Balance for IEEE 802.11b Wireless LAN", Proc. 8th International Conference on Advances in Communication & Control, COMCON 8, Rethymna, Crete, Jun. 2001. Chih-De Huang, "Load Balance in 802.11 Wireless LAN", Department of computer science, National Tsing Hua University, Jul. 31, 2004, pp. 7-13.

* cited by examiner

*Primary Examiner* — Nimesh Patel

(57) ABSTRACT

Disclosed is a load balancing apparatus and method in wireless network hotspots, which comprises a resource allocation module and a load balancer. The resources reallocation module establishes the resources module and the relationship between access points (APs) and STAs in the wireless network hotspots, and seeks possible load balance shift paths (LBSPs). From these possible LBSPs, an LBSP is selected. Based on the selected LBSP, the load balancer reallocates network resources and dynamically arranges the load among the APs in the wireless network hotspots. This invention can be applicable to a centralized or a decentralized wireless communication system.

16 Claims, 13 Drawing Sheets

LOAD BALANCING APPARATUS AND METHOD IN WIRELESS NETWORK HOTSPOTS

FIELD OF THE INVENTION

The present invention generally relates to an apparatus and method for load balancing in the wireless network hotspots.

BACKGROUND OF THE INVENTION

The wireless local area network (WLAN) technology and construction have grown rapidly in recent years. The wireless network is the most important technology for the mobile Internet service. The wireless network is designed as an extension of the Ethernet, and is suitable for best-effort services, such as e-mail and web browsing. But as the real-time media applications, such as voice over IP (VoIP), video streaming, grow popular, a higher demand on the network efficiency is required to guarantee an acceptable quality of service (QoS).

The conventional development is mostly focusing on improving the bandwidth efficiency of a single access point. Many wireless resources management techniques are proposed. However, in a wireless network hotspot, the load balancing problems among the access points (APs) and the overall capacity are not fully discussed.

FIG. 1 shows a schematic view of a conventional wireless network hotspot system structure. As shown in FIG. 1, the wireless network hotspot system includes three parts: Internet, distributed system, and WLAN hotspot.

A wireless network hotspot includes many APs and stations (STAs), and has the following three functions. The first is the admission control unit, through which the APs can determine whether sufficient resources are available for supporting the QoS request. Many admission control techniques can achieve such a function, such as the reference admission control mechanism of IEEE802.11e specification. The second is the radio measurement and management facilities, through which the APs can request the connected STAs to measure the radio, and report the measurement to the APs. Hence, the APs can know the information of the neighboring APs. There are several radio measurement and management techniques, such as IEEE802.11k specification. The third is the fast handoff. The STAs and APs can use the fast handoff technique of IEEE802.11r specification or related techniques.

As shown in FIG. 1, the coverage areas of the APs in a wireless network hotspot usually overlaps with one another. When a wireless network STA is in the network entry stage, a plurality of APs can be detected. The STA usually selects the AP with the best received signal strength indicator (RSSI) to associate with and establish the connection. Then, the STA will occupy some AP resources, such as bandwidth and AP buffer, for service. However, this type of STA-centric network association and service request will lead to the load unbalance among the APs in the wireless network hotspot so that the bandwidth can not be effectively utilized. For wireless multimedia service, such as voice over WLAN (VoWLAN), that demands high quality service, this is an important issue.

The STAs can establish a non-QoS connection or a QoS connection with the AP. When a non-QoS connection is established, such as FTP, e-mail, wed browsing, the so-called best effort (BE) and background (BK) services, the AP does not guarantee the quality of the non-QoS services. When a QoS connection is established, such as voice (VO) or video (VI) connection, the quality of service is guaranteed by the AP. Because the AP must provide QoS guarantee, the majority of bandwidth resources of an AP is allocated to the QoS connections, for example, 80% vs. 20% allocation for QoS and non-QoS, respectively.

FIG. 2 shows a schematic view of a conventional wireless network load system. As shown in FIG. 2, an STA S3 in the network entry stage detects APs A1, A2, and selects an AP with best signal, for instance, A1, for association. When a second STA S9 tries to establish a QoS connection, such as VO or VI connection, S9 issues a QoS connection request to A1. A1 uses admission control unit to determine whether the request can be admitted. As the QoS bandwidth of A1 is fully occupied, the request from S9 cannot be admitted.

In other words, the conventional STA-centric network association mechanism may lead to load unbalance among APs, and results in poor bandwidth utilization.

U.S. Pat. No. 6,574,474 disclosed a method for the STA to select the AP association based on the AP signal strength and load condition so as to achieve load balancing in the wireless network.

U.S. Pat. No. 6,574,477 disclosed a method for load balancing two APs of a single cell. U.S. Pat. No. 6,069,871 disclosed a cellular wireless communication system for multi-carriers. When an STA requests a connection with a base station (BS), a method for searching for a neighbor BS will be provided if the requested BS does not have sufficient resource to provide the connection. The neighbor BS must have sufficient resource to provide the QoS to the requesting STA. International Publication WO 2004/004226 disclosed a method that, in a wireless network, when the bandwidth resource of an AP is below the threshold, the AP searches for a neighbor AP with sufficient bandwidth so that the bandwidth of the neighbor AP will not be below the threshold after providing the service to the STA. All these techniques are specific mechanism activated under specific condition, instead of general solution.

It is imperative to provide a load balancing technique to improve the bandwidth utilization of a wireless network system.

SUMMARY OF THE INVENTION

Examples of the present invention may provide a load balancing apparatus and method in wireless network hotspots. The apparatus includes a resource allocation module and a load balancer. The wireless network hotspots include a plurality of APs and a plurality of STAs.

When an AP cannot admit a QoS request of an STA, the resources allocation module first establishes the resource model and the relation among the AP and the STA of the wireless network hotspot, and finds a load balance shift path (LBSP). Based on the LBSP, the load balancer reallocates the network resources, and dynamically adjusts the loads of a plurality of APs in the wireless network hotspot to improve the bandwidth utilization of the overall wireless network.

When more than one LBSP are found, a plurality of selection schemes can be used to select the LBSP, for example, the LBSP with the least resource consumption cost after the load balancing, or the shortest LBSP. It is also possible to use multiple LBSPs for load balancing operation to achieve the QoS request.

The present invention may be suitable to both centralized and decentralized wireless communication systems. In the centralized wireless communication system, a directed graph, i.e., the relation between AP and the STA in the wireless network hotspot, is used to find the LBSP and adjust the load of the APs to achieve load balancing. In the decentralized communication system, where the information of APs and the STAs are scattered in each AP, the information must be exchanged among the APs without a centralized server to achieve the load balancing.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
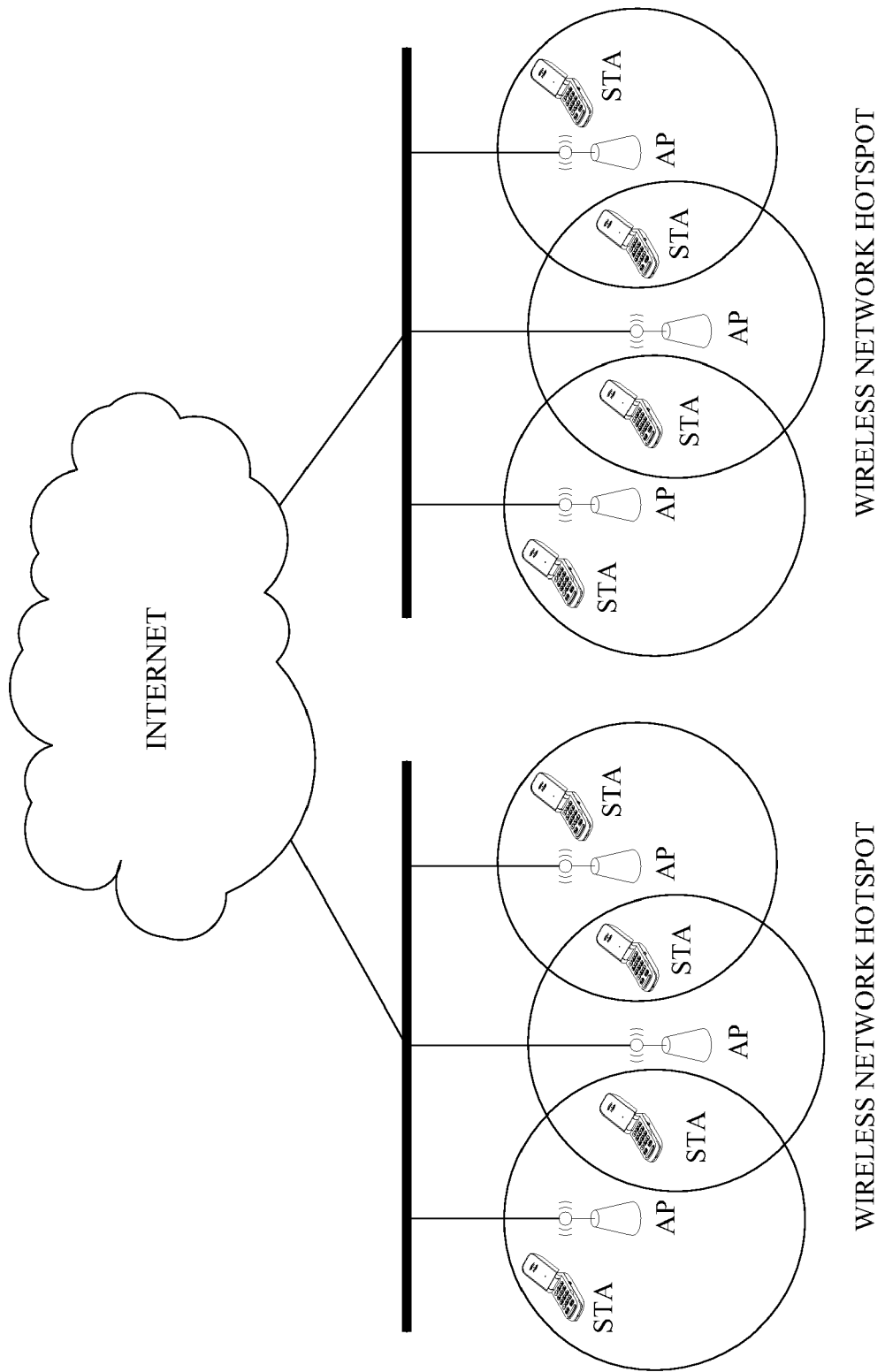
FIG. 1 shows a schematic view of a conventional wireless network hotspot.
Figure 2:
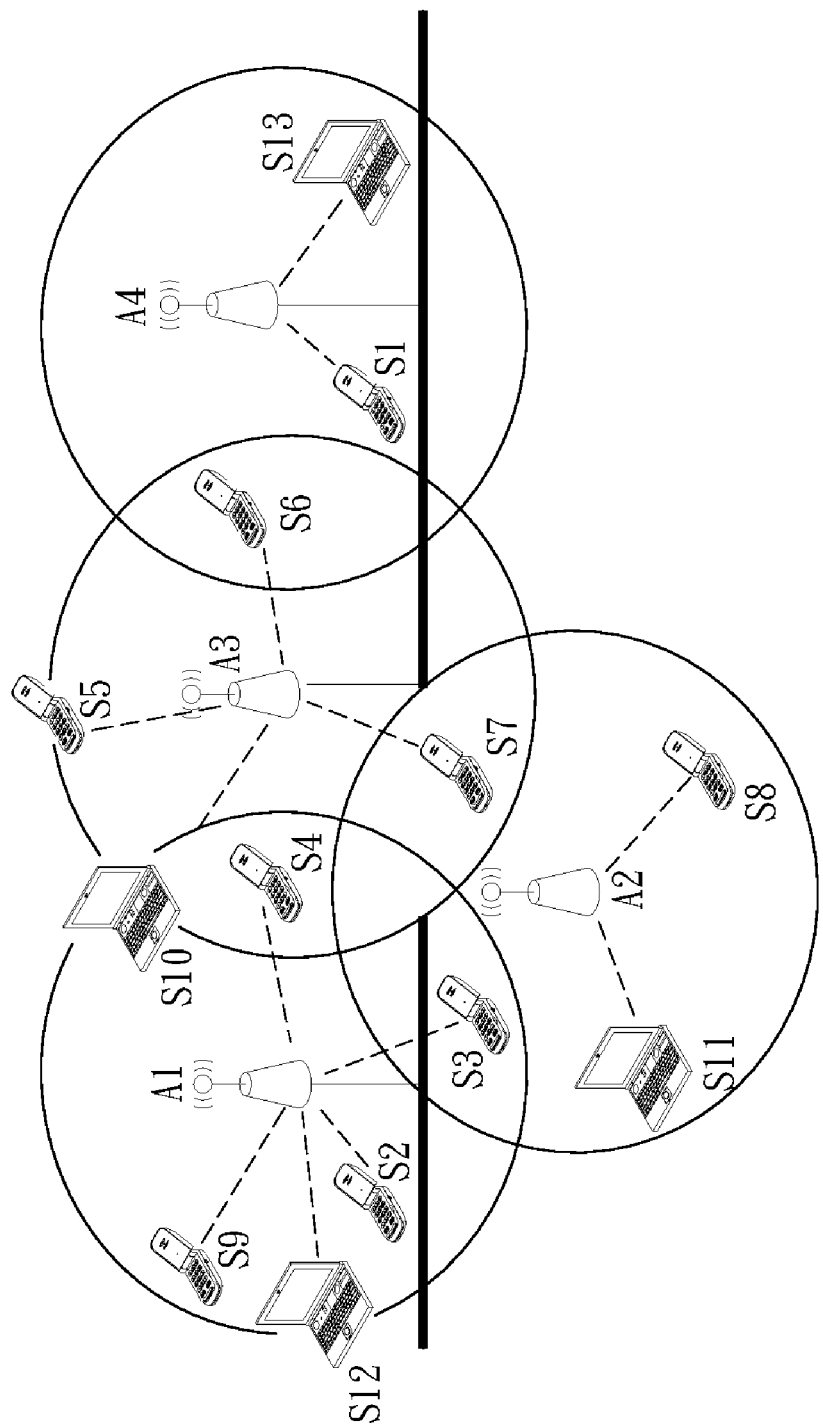
FIG. 2 shows a schematic view of loads of a conventional wireless network.
Figure 3:
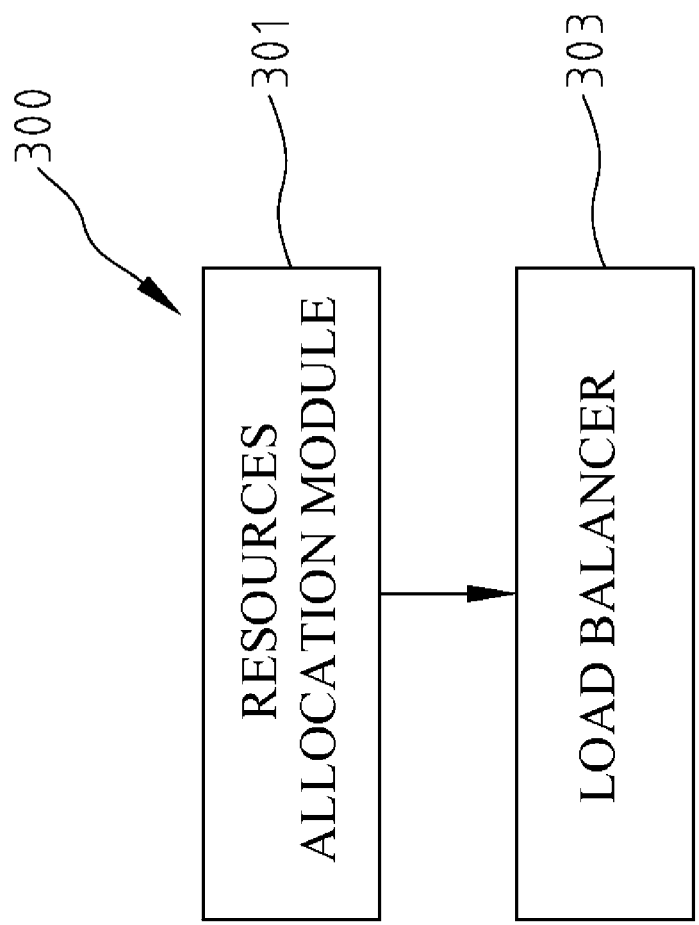
FIG. 3 shows a schematic view of a load balancing apparatus for wireless network hotspot of the present invention.

FIG. 3 shows a schematic view of a load balancing apparatus of wireless network hotspot of the present invention, where the hotspot includes a plurality of APs and STAs. As shown in FIG. 3, a load balancing apparatus 300 includes a resources allocation module 301 and a load balancer 303. When an AP cannot admit a QoS request of an STA, for example, the available bandwidth of an AP is below a threshold, or does not have a sufficient bandwidth, load balancing apparatus 300 performs the dynamic load balancing operation, as shown in FIG. 4.

Figure 4:
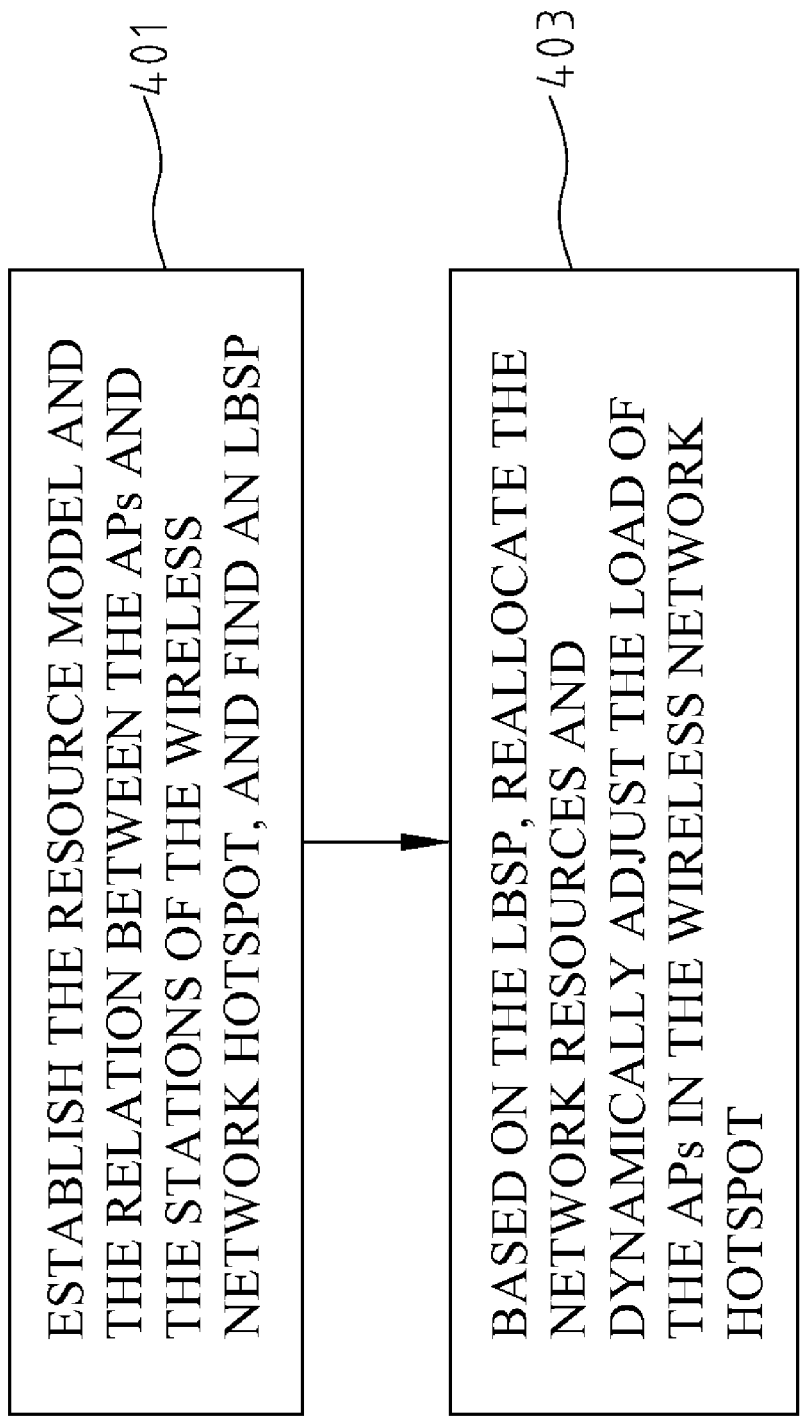
FIG. 4 shows a flowchart of the operation of the apparatus of FIG. 3.

Resources allocation module 301 first establishes the resource model and the relation between the APs and the STAs of the wireless network hotspot, and finds an LBSP, as shown in step 401 of FIG. 4. Based on the LBSP, load balancer 303 reallocates the network resources and dynamically adjusts the load of the APs in the wireless network hotspot to improve the bandwidth utilization of the overall wireless network, as shown in step 403.

The following describes how the resource model between the APs and the STAs is established. A wireless network hotspot includes N APs. For simplicity, all the APs are assumed to be identical, where Ai is the i-th AP in the model, Ci is the bandwidth efficiency of Ai, where Ci is between 0 and 1. Ci=1 implies that the bandwidth of Ai is fully occupied, and Ai has no further bandwidth to provide services to an STA.

Sj is the j-th STA, and connects to Ai of the wireless network hotspot at the speed of Rij Kbps, for example, IEEE802.11b providing the STA with 1 Mbps, 2 Mbps, 5 Mbps, and 11 Mbps connection. Assuming Sj needs the nj service connections, and the k-th service connection is at the speed of $r_k$. When Ai admits the nj service connections, Ai allocates $rate_j/Rij$ resources to these service connections, where $rate_j = \sum_{k=1}^{n_j} r_k$.

The following describes how the two relations between the APs and the STAs of the wireless network hotspot are established. The first relation is the coverage area relation between the APs and the STAs, and the second relation is the service relation between the APs and the STAs.

When some Sj performs wireless network channel scanning and finds Ai, Sj adds Ai to its scan list. Therefore, $p_{i,j}$ defines the coverage area relation between an AP and an STA.

$$p_{i,j} = 1, \text{ when } Ai \text{ in } Sj \text{ scan list;}$$
$$= 0, \text{ otherwise.}$$

If Sj issues a QoS request to Ai, and obtains the admission for connection, $q_{i,j}$ defines the service relation between an AP and an STA.

$$q_{i,j} = 1, Ai \text{ is the serving } AP \text{ for } Sj, \text{ and } Ai \text{ supports } QoS \text{ for } Sj;$$
$$= 0, \text{ otherwise.}$$

The above two relations can be obtained from the serving AP through periodic or non-periodic measurement requests to the STAs.

When Sj needs more resources for new services, and the serving AP cannot admit the request, the load balancing method of the present invention is activated to adjust the load of the APs to accommodate the QoS request of Sj.

Figure 5A:
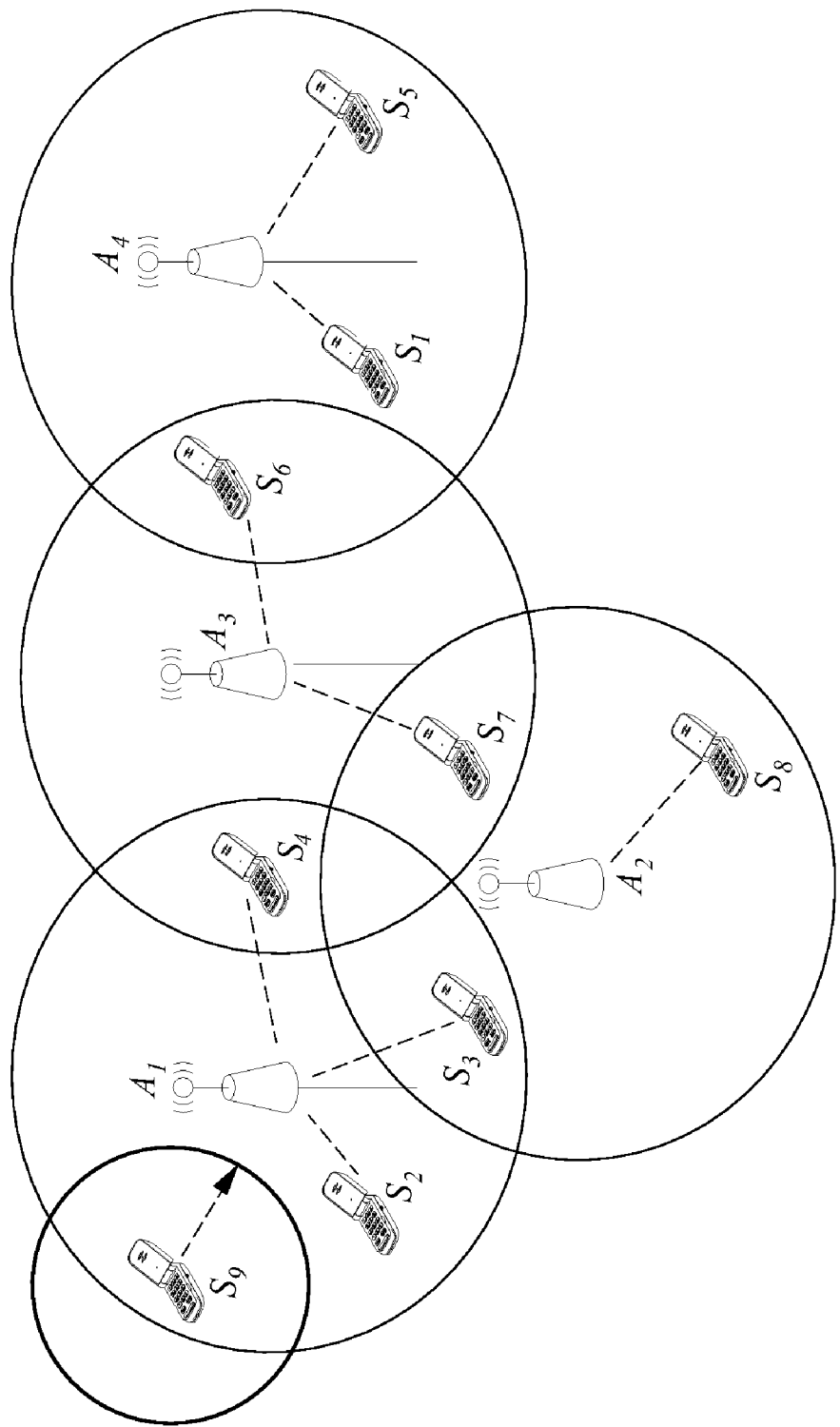
FIG. 5A shows an example of before load balancing.
Figure 5B:
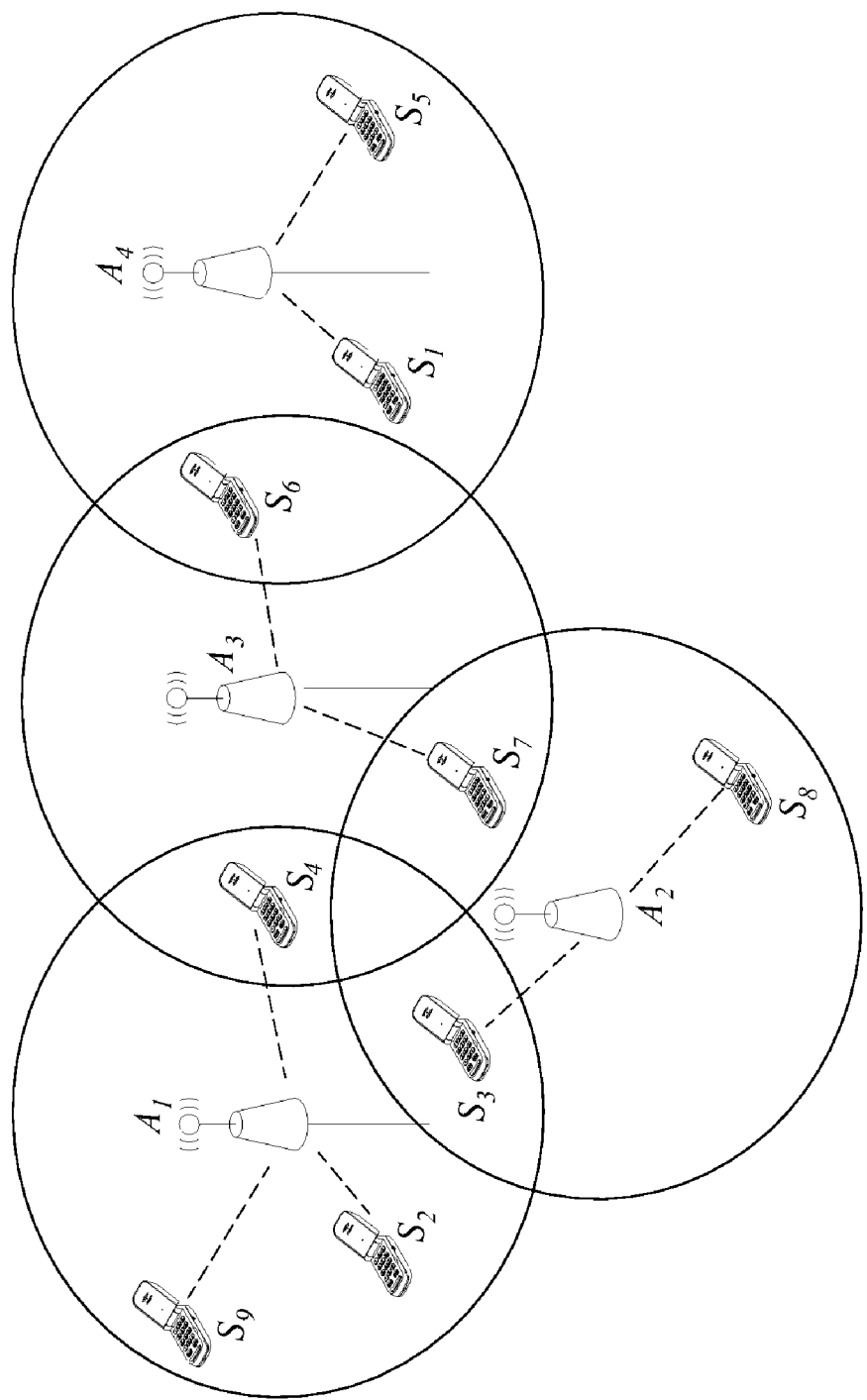
FIG. 5B shows an example of FIG. 5A after load balancing.

FIGS. 5A and 5B show a working example of the dynamic load balancing of the present invention, where FIG. 5A is the relation between AP and STA of a wireless network hotspot before the load balancing, and FIG. 5B shows the relation after the load balancing.

Referring to FIG. 5A, for simplicity, the APs are assumed to have the uniform bandwidth in their coverage areas, and the two neighboring APs use different wireless network channels. Each AP at most supports three wireless network phones, where S1-S8 are connected to A4, A1, A1, A1, A4, A3, A3, and A2, respectively. When S9 requests for wireless network phone connection to A1, the loaded A1 cannot admit the service request to S9. With the present invention, the serving AP of S3 is changed from A1 to A2, and then A1 will have available bandwidth for serving S9. FIG. 5B shows the relation between the AP and the STA after the load balancing operation.

The present invention is applicable to both centralized and decentralized wireless communication systems. In the centralized wireless communication system, a centralized server owns all the information about the APs and the STAs. The present invention uses a directed graph, i.e., directed resource-allocation graph, to describe the relation between the APs and the STAs of the wireless network hotspot, and find the LBSP. Then, the centralized server is used to balance the load of the APs to achieve load balancing of the wireless network.

In the decentralized communication system, where the information of APs and the STAs are scattered in each AP, the present invention uses information exchange to adjust the load among APs to achieve load balancing of the wireless network. Without the use of a centralized server, the cost can be further reduced. The following describes the present invention applied in a centralized and a decentralized wireless communication system, respectively.

Figure 6A:
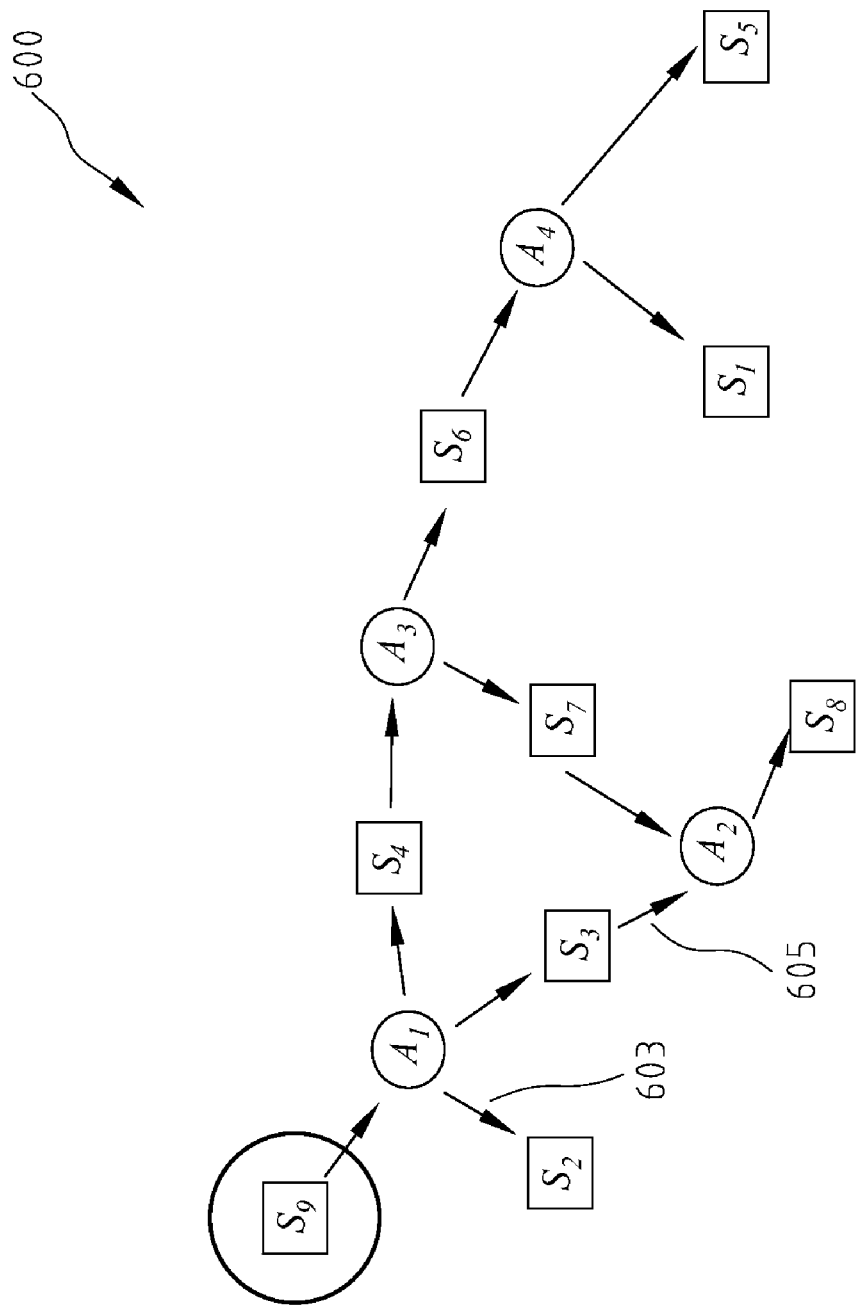
FIG. 6A shows a resource allocation graph of the example in FIG. 5A.

In a centralized wireless communication system, the present invention uses a directed resource-allocation graph to describe the relation between the APs and the STAs, and the loads on the APs. This directed resource-allocation graph includes a plurality of nodes and edges. The nodes represent the APs and the STAs. The edges include a plurality of assignment edges and claim edges. FIG. 6A shows the resource-allocation graph of FIG. 5A. Using FIG. 6A as an example, the following describes the resource-allocation graph.

As shown in FIG. 6A, an edge 603 from A1 to S2 is represented by (A1, S2) to indicate that A1 is serving S2. Edge 603 is an assignment edge. That is, $p_{1,2}=1$, and $q_{1,2}=1$. An edge 605 from S3 to A2 is represented by (S3, A2) to indicate that A2 is in the scan list of S3 but not serving S3. Edge 605 is a claim edge. That is, $p_{2,3}=1$, and $q_{2,3}=0$. The only exception is a claim edge from S9 to A1 represented by (S9, A1) to indicate that S9 is requesting service from A1.

Through resource-allocation graph 600, the relation between APs and STAs can be easily understood. In a centralized wireless communication system, the resource model between the APs and the STAs of the wireless network hotspots established by resources allocation module 301 of the present invention is the resource allocation graph.

As mentioned, when S9 requests to A1 for wireless network phone service, and A1 is unable to admit the request, the load balancing apparatus of the present invention can be activated to find an LBSP and adjust the loads of APs to accommodate S9's request.

When more than one LBSP is found, many path selection solutions can be used to select an LBSP, for example, path that spends the minimal resources, shortest path, i.e., path that minimizes migration overhead. In the present invention, three paths can be found using resource-allocation graph: {(S9, A1), (A1,S4), (S4, A3), (A3, S6), (S6, A4)}, {(S9, A1), (A1, S4), (S4, A3), (A3, S7), (S7, A2)}, {(S9, A1}, (A1, S3), (S3, A2)}.

If the path that spends the minimal resources is selected, all the edges on the LBSP must be assigned a weight Wij. For an assignment edge, Wij=−Rij. For a claim edge, Wij=Rij. By adding all the weights of the edges on a path, the weight of an LBSP is calculated, and the LBSP with the minimal weight is selected.

If the shortest path is adopted, {(S9, A1), (A1, S3), (S3, A2)} will be selected.

Figure 6B:
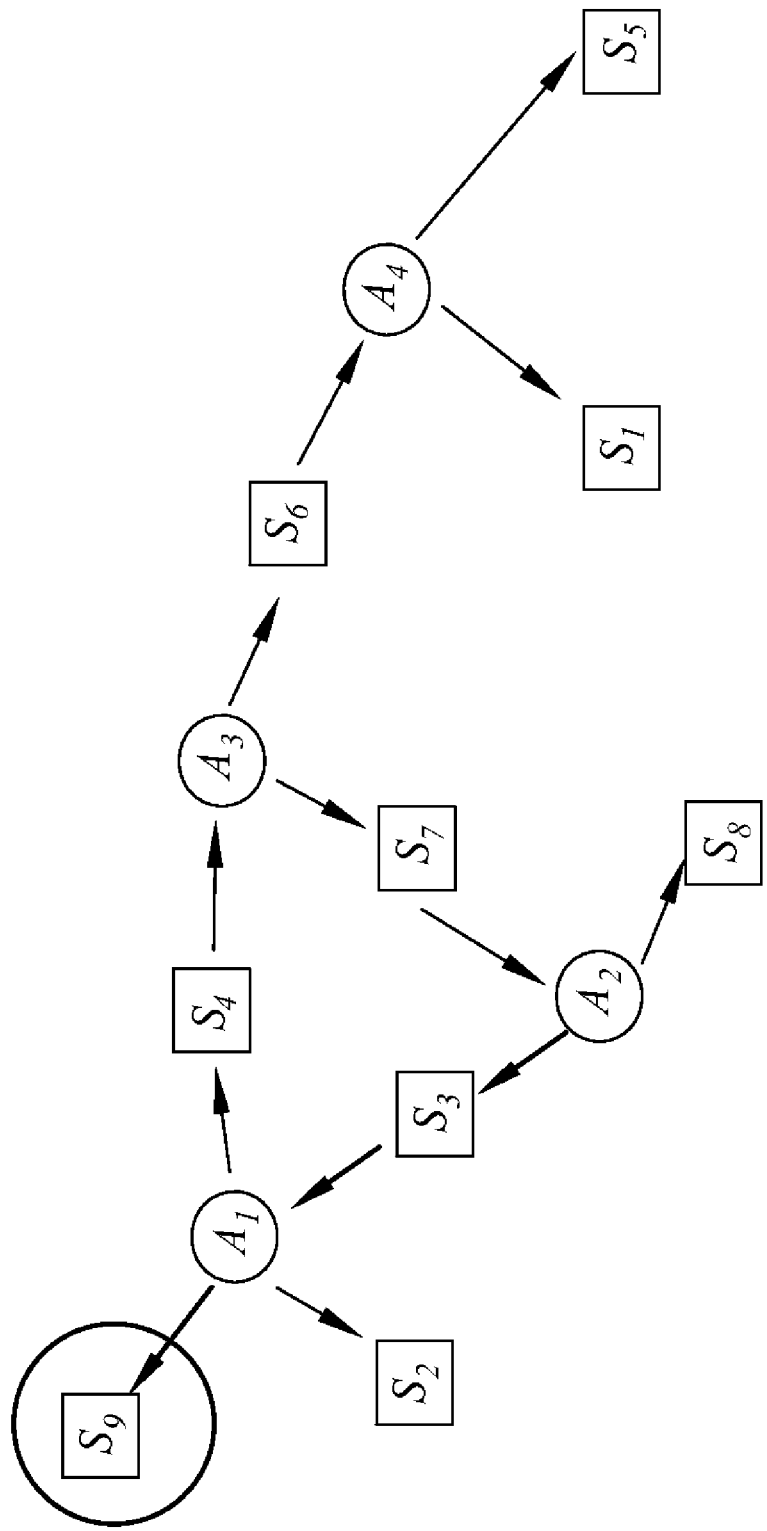
FIG. 6B shows the resource allocation graph of the example in FIG. 5B.

Once the LBSP is selected, for example, {(S9, A1), (A1, S3), (S3, A2)}, the direction of the edges on the LBSP must be reversed; that is, assignment edge 603 becomes claim edge 605, and vice versa. Therefore, the path {(S9, A1), (A1, S3), (S3, A2)} is reversed into {(A1, S9), (S3, A1), (A2, S3)}. In this case, S9 is served by A1. FIG. 6B shows the resource allocation graph of FIG. 5B after the load balancing operation.

The above example uses an LBSP to achieve the admission of the QoS request. The LBSP sub-graph approach can also be used. That is, a plurality of LBSPs can be used together to achieve the load balancing and admission of the QoS request. The following describes the LBSP sub-graph approach using FIG. 6B.

Figure 7A:
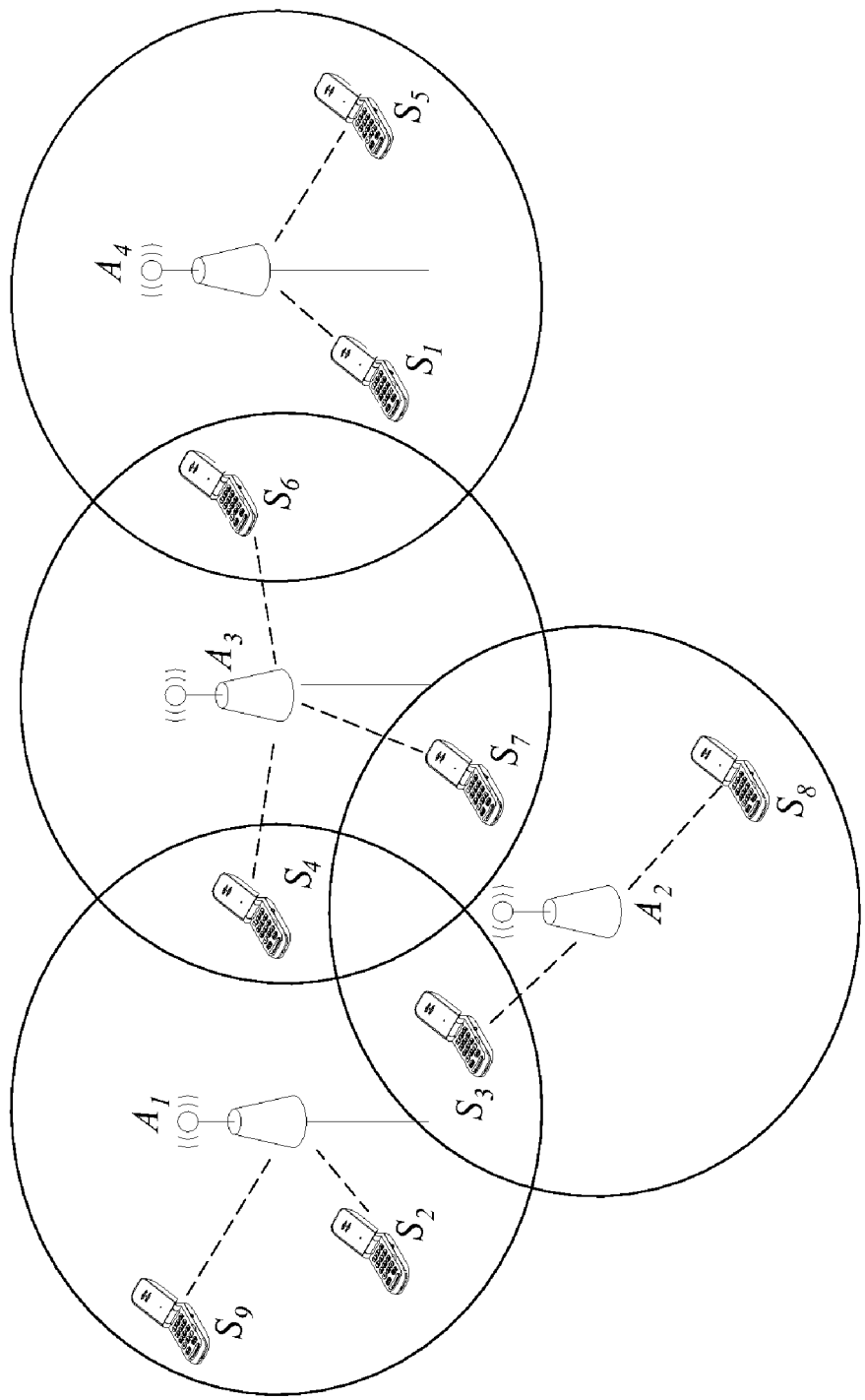
FIG. 7A shows an LBSP sub-graph after load balancing of the present invention.

When S9 request for QoS connection to A1, A1 must obtain the bandwidths of S3 and S4 to satisfy the S9's request. Therefore, a plurality of LBSPs must be selected to migrate S3 and S4 to neighbor APs, A2 and A3 respectively, to satisfy the request. This is the LBSP sub-graph, as shown in FIG. 7A.

Figure 7B:
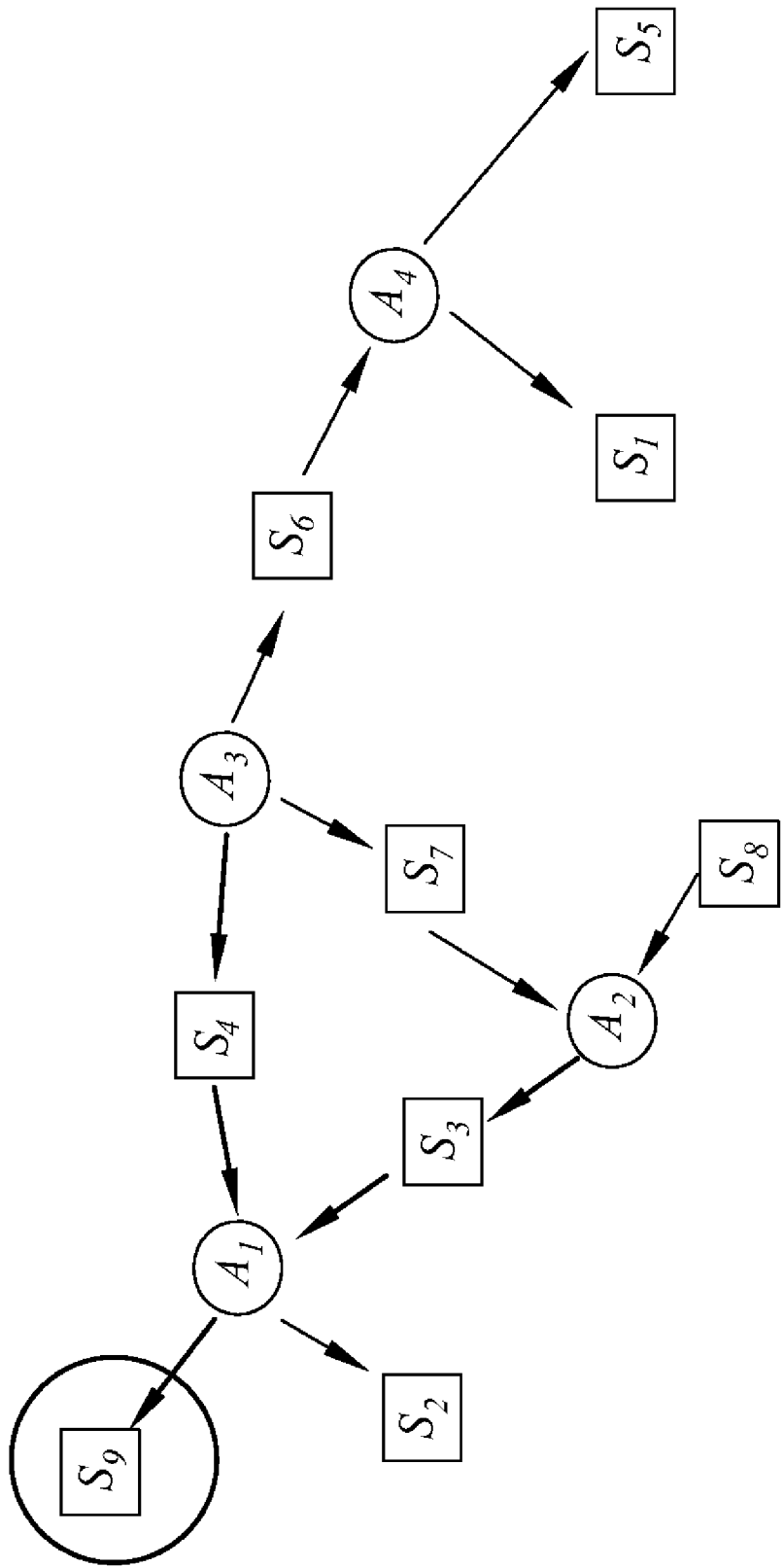
FIG. 7B shows a resource allocation graph of FIG. 7A.

FIG. 7B shows the resource allocation graph, where the LBSP sub-graph is to reverse the {(S9, A1), (A1, S3), (S3, A2), (A1, S4), (S4, A3))} to {(A1, S9), (S3, A1), (A2, S3), (S4, A1), (A3, S4)}. That is, S3 is migrated to A2, and S4 is migrated to A3.

The above two examples show how the present invention is applied to a centralized wireless communication system. The central server owns all the related information of APs and STAs, and the load balancing after the finding of LBSP is also performed by the central server. However, the centralized wireless communication system requires the extra hardware cost of the central server.

Figure 8:
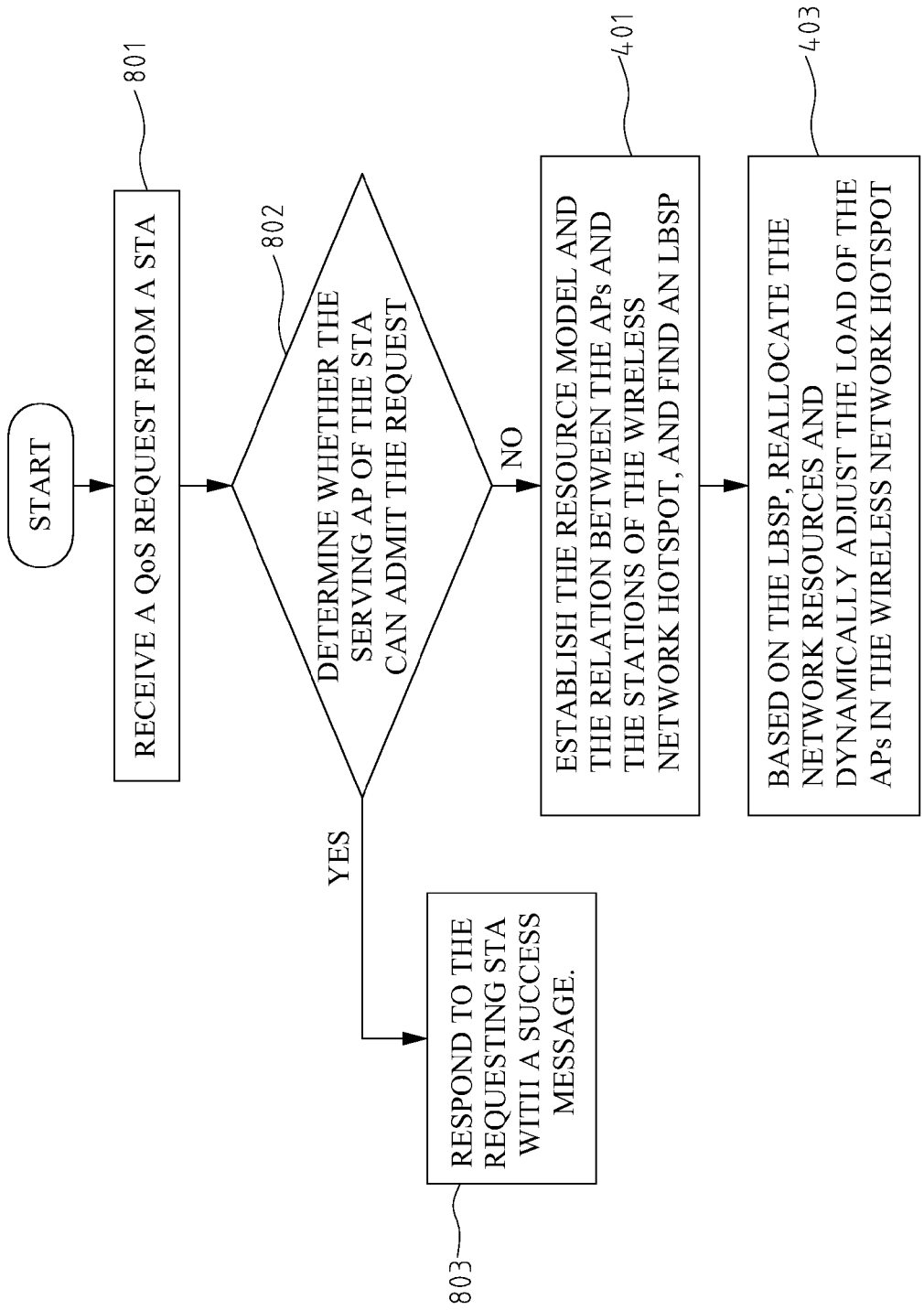
FIG. 8 shows a flowchart of the load balancing operation of the present invention in a centralized wireless communication system after receiving a QoS request.

FIG. 8 shows a flowchart of the load balancing operation in a centralized wireless communication network after receiving the QoS request. As shown in FIG. 8, step 801 is to receive a QoS request from an STA. Step 802 is to determine whether the serving AP of the STA can admit the request. If yes, take step 803 to respond to the requesting STA with a success message. If not, take step 401 to establish the resource model and relation between the APs and the STAs of the wireless network hotspot, and then find an LBSP for the serving AP to accommodate the requesting STA. Finally, step 403 is to re-allocate network resources and balance the loads of APs according to the LBSP, using such as IEEE802.11r fast handoff technique, to improve the bandwidth utilization of the overall wireless network.

As mentioned, when the resource model and the relation between the APs and STAs are established, all the possible LBSPs are found, and if there is more than one LBSp, several path selection solutions can be used to select the path, such as path that spends the minimal resources, shortest path, i.e., path that minimizes migration overhead. In addition, a plurality of LBSPs can be selected together to balance the load to accommodate the QoS request.

Because the centralized wireless communication network requires a central server, the present invention also provides a load balancing method for decentralized wireless communication network. The related information of APs and the STAs are scattered in each AP in a decentralized wireless communication system, and all the findings of the LBSP must be accomplished through information exchange between APs. This method includes the use of flooding to transfer the LBSP finding request to the neighbor AP to find a LBSP.

Figure 9:
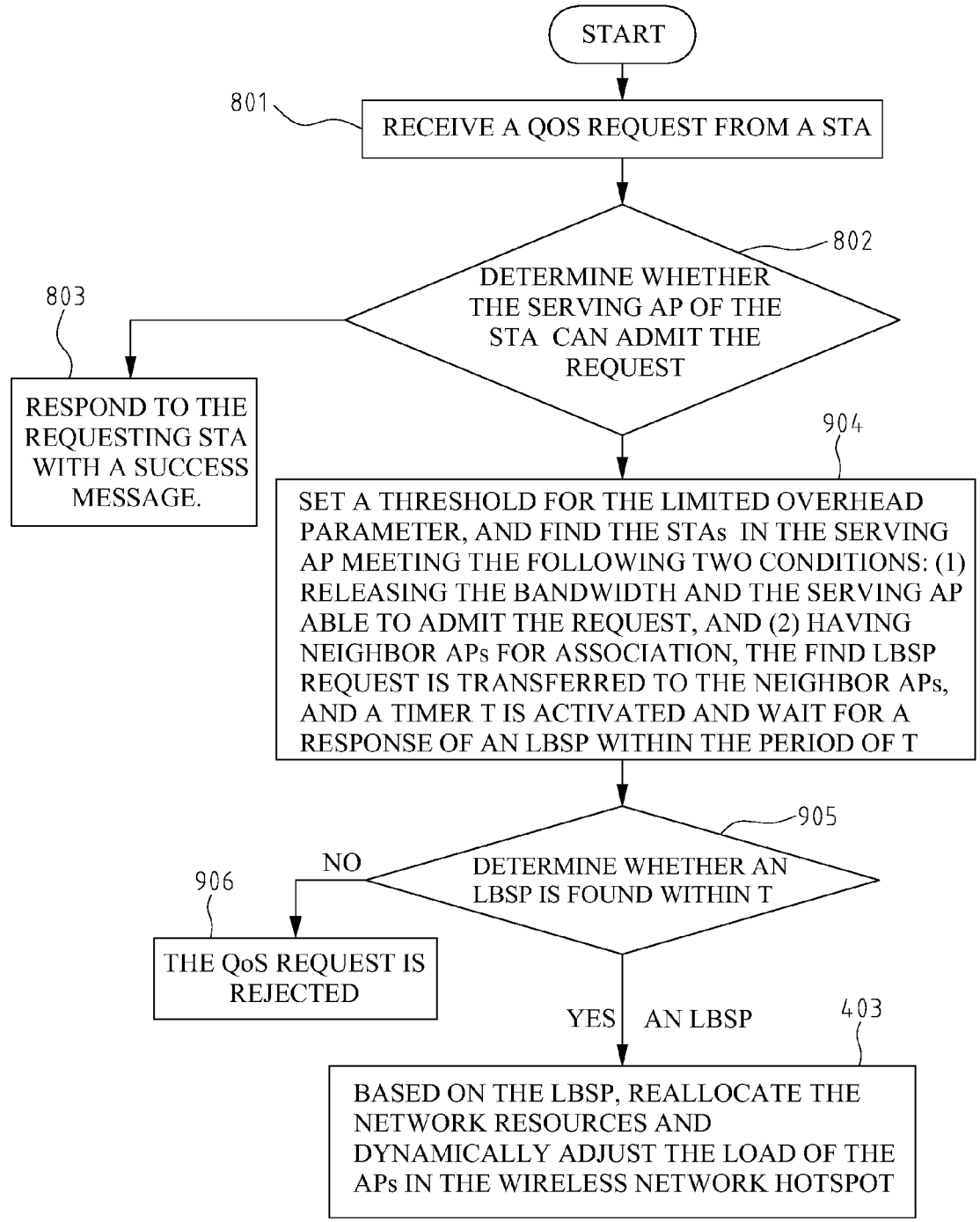
FIG. 9 shows a flowchart of the load balancing operation of the present invention in a decentralized wireless communication system after receiving a QoS request.

FIG. 9 shows a flowchart of the load balancing operation in a decentralized wireless communication network after receiving the QoS request. As shown in FIG. 9, after step 802, if the resource of the serving AP does not allow the AP to admit the request, step 904 is used to replace step 401.

Step 904 is to set a threshold for the limited overhead parameter, and find the STAs in the serving AP meeting the following two conditions: (1) releasing the bandwidth and the serving AP able to admit the request, and (2) having neighbor AP for association. Then, the find LBSP request is transferred to the neighbor APs, and a timer T is activated. Finally, the next step is to wait for a response of an LBSP within the period of T.

According to the present invention, the find LBSP request includes the traced path, limited overhead parameter, threshold of the limited overhead parameter, and corresponding QoS parameters, and so on. The traced path includes the ID information of the APs and the STAs on the path. The limited overhead parameter may include the limits on the additional bandwidth, or the number of APs searched.

After the timer T is expired, if neighbor APs respond, the traced path included in the response is selected. If more than one response is received, a path selection solution is used to select a path, and take step 403 following the selected path.

As shown in step 905, if an LBSP is found within T, the last AP on the path includes the response of the traced path, and following step 403, which is described earlier. If no response is received by AP within T, the request is rejected, and a failure message is issued to the STA, as shown in step 906.

Figure 10:
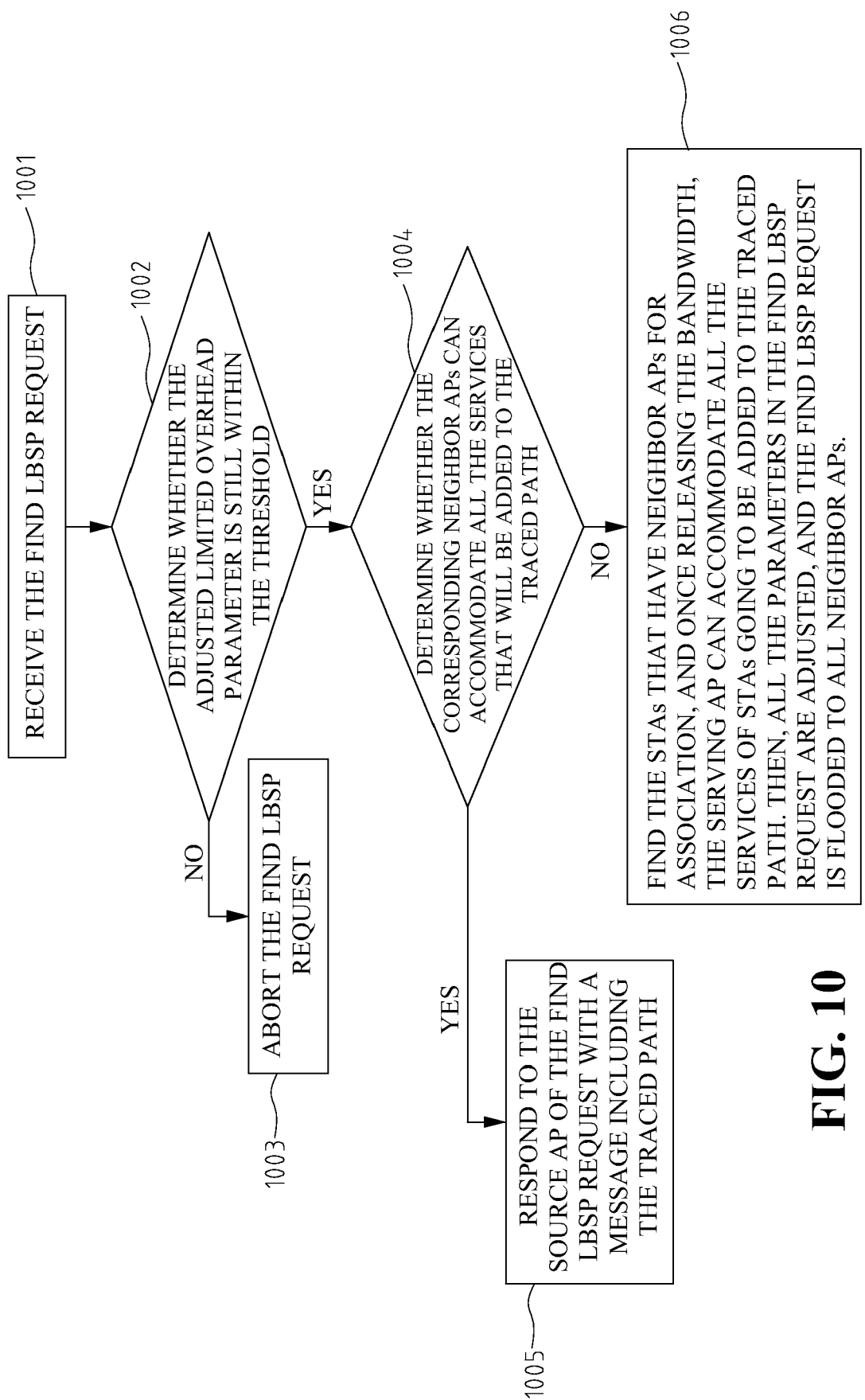
FIG. 10 shows a flowchart of the operation of the present invention after receiving a find LBSP request.

It is worth noticing that the T must set to effectively solve the problem of over-time in finding the LBSP. FIG. 10 shows a flowchart of the present invention after receiving a find LBSP request.

As shown in FIG. 10, step 1001 is for the neighbor APs to receive the find LBSP request. Step 1002 is to adjust the limited overhead parameter, and determine whether the adjusted limited overhead parameter is still within the threshold. If not, take step 1003 to abort the find LBSP request. Otherwise, take step 1004 to determine whether the corresponding neighbor AP can accommodate all the services of STAs that will be added to the traced path. If so, take step 1005 to respond to the source AP of the find LBSP request with a message including the traced path. The source AP is the first AP of the traced path. Otherwise, take step 1006.

Step 1006 is to find the STAs that have neighbor APs for association, and once releasing the bandwidth, the serving AP can accommodate all the services of STAs going to be added to the traced path. Then, all the parameters except the limited overhead parameters in the find LBSP request are adjusted, for example, adding itself and corresponding STAs to traced path, and updating the QoS parameter of the corresponding STAs. Finally, the find LBSP request is transferred to all neighbor APs.

Similarly, an AP receiving the find LBSP request will follow the above flowchart, and so on, until the LBSP is found or the limited overhead parameter exceeds the threshold. This method can effectively solve the problem of over-time in finding the LBSP, and avoids finding the path that the migration overhead is too much.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A load balancing apparatus for a wireless network hotspot having a plurality of access points (APs) and a plurality of stations (STAs), said apparatus comprising:
    a resource allocation module for creating a resource model and relation among said plurality of APs and said plurality of STAs and finding a load balancing shift path (LBSP) from said resource model, said relation including the relation between a serving AP and a served STA, the relation between a scanning STA and an AP scanned by but not serving said scanning STA;
    a directed resource allocation graph having directional edges between said APs and said STAs for capturing utilization status of said APs and said relation among said APs and said STAs to describe said resource model, said directional edges including a plurality of assignment edges each connecting and pointing from a serving AP to an STA served by the serving AP, and a plurality of claim edges each connecting and pointing from a scanning STA to an AP scanned by but not serving the scanning STA; and
    a load balancer for re-allocating network resources and dynamically adjusting loads of said plurality of APs based on said LBSP, said LBSP being found according to said directed resource allocation graph by changing and tracing directions of said directional edges to adjust said relation among said APs and said STAs and reallocate network resources;
    wherein when a requested AP of said APs in said wireless network hotspot can not admit a quality of service (QoS) request of a requesting STA due to inadequate resource, said resource allocation module adds relation between said requesting STA and said requested AP in said resource model in order to find said LBSP from said resource model by using a claim edge to connect said requesting STA to said requested AP in said directed resource allocation graph for finding said LBSP from said directed resource allocation graph.

2. The apparatus as claimed in claim 1, wherein said apparatus is applied to a decentralized wireless communication system.

3. The apparatus as claimed in claim 1, wherein said apparatus is applied to a centralized wireless communication system.

4. A load balancing method for a wireless network hotspot having a plurality of access points (APs) and a plurality of stations (STAs), said method comprising the steps of:
    establishing a resource model and relation among said plurality of APs and said plurality of STAs, said relation including the relation between a serving AP and a served STA, the relation between a scanning STA and an AP scanned by but not serving said scanning STA;
    forming a directed resource allocation graph having directional edges between said APs and said STAs for capturing utilization status of said APs and said relation among said APs and said STAs to describe said resource model, said directional edges including a plurality of assignment edges each connecting and pointing from a serving AP to an STA served by the serving AP, and a plurality of claim edges each plurality of APs and said plurality of STAs, said relation including the relation between a serving AP and a served STA, the relation between a scanning STA and an AP scanned by but not serving said scanning STA;
    forming a directed resource allocation graph having directional edges between said APs and said STAs for capturing utilization status of said APs and said relation among said APs and said STAs to describe said resource model, said directional edges including a plurality of assignment edges each connecting and pointing from a serving AP to an STA served by the serving AP, and a plurality of claim edges each connecting and pointing from a scanning STA to an AP scanned by but not serving the scanning STA;
    adding relation between a requesting STA and a requested AP of said APs in said directed resource allocation graph by using a claim edge to connect said requesting STA to said requested AP in said directed resource allocation graph for finding said LBSP from said directed resource allocation graph when said requested AP can not admit a quality of service (QoS) of said requesting STA due to inadequate resource;
    finding a load balancing shift path (LBSP) from said resource model according to said directed resource allocation graph by changing and tracing directions of connecting and pointing from a scanning STA to an AP scanned by but not serving the scanning STA;

adding relation between a requesting STA and a requested AP of said APs in said directed resource allocation graph by using a claim edge to connect said requesting STA to said requested AP in said directed resource allocation graph for finding said LBSP from said directed resource allocation graph when said requested AP can not admit a quality of service (QoS) of said requesting STA due to inadequate resource;

finding a load balancing shift path (LBSP) from said resource model according to said directed resource allocation graph by changing and tracing directions of said directional edges to adjust said relation among said APs and said STAs; and re-allocating network resources and dynamically adjusting loads of said plurality of APs according to said LBSP.

5. The method as claimed in claim 4, wherein said method uses a fast handoff technique to dynamically adjust said loads of said plurality of APs.

6. The method as claimed in claim 4, wherein said method identifies a number of possible LBSPs before said LBSP is found.

7. The method as claimed in claim 4, wherein a path in said resource model requiring minimum resources is chosen as said LBSP.

8. The method as claimed in claim 4, wherein a path in said resource model minimizing migration overhead is chosen as said LBSP.

9. The method as claimed in claim 4, wherein said relation between said APs and said STAs comprises the relation based on coverage areas between said plurality of APs and said plurality of STAs, and the relation based on services between said plurality of APs and said plurality of STAs.

10. The method as claimed in claim 4, wherein said method is applied to a centralized wireless communication system.

11. The method as claimed in claim 10, wherein a central server is used in said method to store information of said plurality of APs and said plurality of STAs, find said LBSP and dynamically adjust and balance loads among said plurality of APs.

12. The method as claimed in claim 4, wherein said method is applied to a decentralized wireless communication system.

13. A load balancing method for a wireless network hotspot having a plurality of access points (APs) and a plurality of stations (STAs), said method comprising the steps of:

establishing a resource model and relation among said plurality of APs and said plurality of STAs, said relation including the relation between a serving AP and a served STA, the relation between a scanning STA and an AP scanned by but not serving said scanning STA;

adding relation between a requesting STA and a requested AP of said APs in said resource model when said requested AP can not admit a quality of service (QoS) of said requesting STA due to inadequate resource;

finding a load balancing shift path (LBSP) from said resource model; and re-allocating network resources and dynamically adjusting loads of said plurality of APs according to said LBSP;

wherein said step of finding said LBSP further includes the steps of:

setting a threshold for a limited overhead parameter;

finding a relocate-able STA served by said requested AP, said relocate-able STA being able to release adequate bandwidth for said requested AP to admit and provide said QoS of said requesting STA, and having a neighboring AP for association;

sending a find LBSP request to said neighboring AP; and waiting for a response of said find LBSP request within a period of time.

14. The method as claimed in claim 13, wherein said requested AP floods a find LBSP request to neighbor APs to find said LBSP.

15. The method as claimed in claim 14, wherein said find LBSP request includes information of a traced path, a limited overhead parameter, a threshold for said limited overhead parameter, and a plurality of QoS parameters.

16. The method as claimed in claim 15, wherein said method performs the following steps after receiving said find LBSP request:

determining if said limited overhead parameter is still within said threshold after said limited overhead parameter is adjusted for responding to said find LBSP request;

aborting said find LBSP request if said threshold is exceeded, otherwise determining if said neighbor APs can accommodate all STAs that will be added to said neighbor APs in said traced path of said LBSP;

responding to said requested AP with a message including said traced path if said neighbor APs can accommodate the added STAs, otherwise finding STAs that have neighbor APs for association; and adjusting all the parameters in said find LBSP request and transferring said find LBSP request to all neighbor APs of the STAs that have neighbor APs for association.

* * * * *